United States Patent [19]

Cook

[11] 4,172,192

[45] Oct. 23, 1979

[54] PROCESS FOR STABILIZING THERMOPLASTIC POLYURETHANES AND STABILIZED PRODUCT

[75] Inventor: William H. Cook, Bloomfield Hills, Mich.

[73] Assignee: Kemerica, Inc., Bloomfield Hills, Mich.

[21] Appl. No.: 784,260

[22] Filed: Apr. 4, 1977

[51] Int. Cl.$^2$ .................. C08G 18/82; C08G 18/83; C08J 11/04
[52] U.S. Cl. .................................. 525/453; 260/2.3; 528/44
[58] Field of Search ............ 260/2.3, 75 NA, 77.5 A, 260/77.5 SS; 528/46, 44

[56] References Cited

U.S. PATENT DOCUMENTS

| | | | |
|---|---|---|---|
| 2,702,797 | 2/1955 | Rugg .............................. | 260/77.5 A |
| 2,917,486 | 12/1959 | Nelson et al. ................. | 260/77.5 A |
| 2,944,998 | 7/1960 | Buxbaum ....................... | 260/77.5 A |
| 3,192,185 | 6/1965 | Achterhof et al. .......... | 260/77.5 AA |
| 3,210,272 | 10/1965 | Foster et al. .................. | 260/77.5 A |
| 3,240,842 | 3/1966 | Saunders ........................ | 260/77.5 A |
| 3,321,433 | 5/1967 | Baumann ........................ | 260/77.5 A |
| 3,332,912 | 7/1967 | Rochlitz et al. .............. | 260/77.5 A |
| 3,420,796 | 1/1969 | Matsubayashi et al. .... | 260/77.5 AA |
| 3,822,240 | 7/1974 | Schmitt et al. ............... | 260/77.5 TB |
| 3,926,909 | 12/1975 | Wei ................................. | 260/77.5 SS |
| 4,046,741 | 9/1977 | Scher ............................. | 260/77.5 SS |

*Primary Examiner*—H. S. Cockeram
*Attorney, Agent, or Firm*—Gordon W. Hueschen

[57] ABSTRACT

Thermoplastic polyurethanes are treated in the solid particulate state with a volatile free agent selected from alcohols and amines which are reactive with NCO groups at a temperature below that at which aminolysis or alcoholysis of urethane groups takes place, continuing the treatment until the reagent is substantially diffused throughout the polyurethane, and then pulling a vacuum on the treated polyurethane to remove any unreacted reagent.

29 Claims, No Drawings

PROCESS FOR STABILIZING THERMOPLASTIC POLYURETHANES AND STABILIZED PRODUCT

BACKGROUND OF THE INVENTION

Field of Invention

The invention relates to a process for the stabilizing of thermoplastic polyurethanes.

Thermoplastic polyurethanes are commonly prepared in particulate form for use in thermoforming operations. Sometimes the particles or granules of the polyurethane are dissolved in a solvent and the resultant solution used in paints or varnishes or for casting of films.

However carefully the manufacture of thermoplastic polyurethane granules is carried out, the product frequently tends to undergo significant change on aging. It is an object of this invention to treat thermoplastic polyurethane in a particulate solid state so as to stabilize it against substantial change in its properties on aging.

The invention also relates to a process for altering the characteristics of thermoplastic polyurethane thermosets.

Some thermoplastic polyurethanes are so formulated that after being formed, they can be heated to convert them to thermoset polymers. It sometimes happens, however, that such thermoplastic polyurethane thermosets have desirable properties for solution applications in which the thermosetting characteristic is undesirable. It is an object of the invention therefore to treat thermoplastic polyurethane thermosets to destroy the thermosetting character thereof without substantially altering the properties of the thermoplastic polyurethane thermoset which make it desirable for solution applications.

SUMMARY OF THE INVENTION

The invention relates to the treatment of thermoplastic polyurethanes or thermoplastic-thermosetting polyurethane polymers to stabilize them against change of properties on aging or heating and is particularly directed to a process in which a polyurethane of the class described is treated while in the solid particulate state with a volatile reagent selected from amines and alcohols which are reactive with isocyanate groups at a temperature below that at which aminolysis or alcoholysis takes place, continuing the treatment at a temperature below that at which aminolysis or alcoholysis takes place until the reagent is substantially diffused throughout the polyurethane and has reacted with any isocyanate groups present, and, advantageously, then pulling a vacuum on the treated particulate solid polyurethane to remove any excess reagent.

The invention is particularly directed to the treatment of thermoplastically processable polyurethanes which are not intended to have thermosetting characteristics by virtue of polymer chain ends which are predominantly isocyanate-terminated. It has been found in accordance with the invention that such polymers, however carefully they are made, nevertheless generally contain free isocyanate groups, as well as free hydroxyl groups, so that changes in the physical properties of the polyurethanes, particularly their thermoplastic processability characteristics, occur on storage or transportation, with or without application of heat, due to gradual reaction of the isocyanate residuum. The process of the invention is effective in stabilizing such polyurethanes against such changes due to reaction of residual isocyanate with other groups in the polymer or with absorbed moisture.

In carrying out the invention, the thermoplastically processable polyurethane, whether a non-thermosetting type or a thermosetting type, is treated in the solid particulate state, preferably in a closed container, with a volatile reagent selected from amines and alcohols reactive with isocyanate groups at a temperature below that at which aminolysis or alcoholysis takes place, continuing the treatment in the presence of the reagent and at a temperature below that at which aminolysis or alcoholysis takes place until substantial diffusion of the reagent throughout the polyurethane is obtained and the residuum of isocyanate has been substantially eliminated by reaction with the reagent, and then pulling a vacuum on the treated particulate solid to remove any excess reagent.

In the case of certain reagents, particularly certain alcohols, any excess reagent optionally need not be removed if the polyurethane is to be used subsequently in an application where the presence of the residual reagent would not be detrimental. For example, a small residuum of isopropyl alcohol often would not be objectionable if the polyurethane were to be dissolved subsequently and employed as a coating.

In carrying out the process of the invention, a minor amount only of the reagent is required. It is usually an objective to eliminate all free isocyanate groups, and of course for each polyurethane in which this is to be accomplished there is a minimum theoretical amount of reagent required, that is, a minimum of one equivalent of amine or alcohol for each equivalent of isocyanate present in the polymer. However, even in the case of amines, which generally are highly reactive with isocyanates even at normal room temperatures, it usually is desirable to employ an excess of the primary or secondary amine so as to reduce the time required for the amine to diffuse throughout the solid particles and react with substantially all of the residual isocyanate. Another reason for employing excess reagent is that it is generally not convenient to determine the exact quantity of residual isocyanate, and there usually is no significant additional cost or disadvantage incurred in using such excess reagent. The amount of excess amine which it is convenient to employ ranges up to as much as 20 times the theoretical requirement or more, with two to ten times the theoretical requirement being more preferred. As the residual isocyanate contents of thermoplastically processable polyurethanes vary widely, the relative amount of amine which is acceptable also varies widely on the basis of a weight percentage of the polymer. However, most all common types of these polyurethanes can be treated efficiently with from about 0.25 weight percent amine to about five weight percent amine, based on dibutylamine. In the cases of other amines, the preferred amounts are greater or smaller in proportion to the equivalent weight of the amine relative to dibutylamine, and also in proportion to the overall diffusion rate and reactivity of the amine relative to dibutylamine. Obviously, it may be desirable to employ smaller amounts of the amine as its diffusion rate and/or reactivity increases.

As alcohols are much less reactive than amines with isocyanates, it usually is appropriate to employ relatively greater excesses of alcohols than of amines in the treatment of typical polymers. Furthermore, the temperature at which alcoholysis might occur is significantly greater than the temperatures at which aminolysis would be a concern. In some cases, that is, with certain polymer-alcohol combinations, it is convenient and practical to immerse the particulate solid polyurethane in the alcohol at ambient temperature or above for a period of time sufficient for diffusion of alcohol throughout the solid and for reaction of the alcohol with substantially all the residual isocyanate groups, and then to drain off the surplus liquid alcohol and evaporate the residual alcohol under reduced pressure and optionally at elevated temperature up to about 100° C. Optionally, if the polyurethane is to be dissolved, it may be practical or even desirable to leave the residual alcohol, absorbed on and in the solid, so long as this residual alcohol would not have a deleterious effect in subsequent dissolution of the polymer and/or upon usage of the solution in its intended application.

In accordance with the preferred embodiment of the invention, the thermoplastic polyurethane is treated in the particulate solid state with a reagent of the class described which is essentially non-solvent for the polyurethane. Such a reagent can be incorporated in the particulate solid without causing the particles to adhere together or to agglomerate so that effective diffusion of the reagent through the polymer is obtained with a minimum of agitation and a minimum of time.

Suitable such non-solvent reagents comprise secondary aliphatic and cycloaliphatic amines having at least 7 carbon atoms, such as methylcyclohexylamine, dibutylamine, diamylamine, diisobutylamine, dihexylamine, dicyclohexylamine, dioctylamine and di-2-ethylhexylamine, and advantageously containing not more than twelve carbon atoms. Among the alcohols which are suitable non-solvent reagents are the lower primary and secondary alcohols of up to about ten carbon atoms, and advantageously containing not more than six carbon atoms, such as methanol, ethanol, 1-propanol, 2-propanol, 1-butanol, 2-butanol, 2-methylpropanol-1, pentanol-1, pentanol-2, pentanol-3 and hexanol-1.

In the case of the lower members of this series of alcohols, in particular, methanol, ethanol and 1-propanol, ceratin alcohol-polyurethane combinations are not desirable, particularly at temperatures above normal room temperature, as excessive swelling and sometimes even fragmentation of the solid may occur. This problem may be avoided by selection of an alternate alcohol which does not act in this manner on the particulate solid but which nevertheless has adequate diffusion characteristics. It is usually desirable to employ an alcohol of from one to three carbon atoms, if there is not a swelling problem, in the interest of economy, high diffusion rate, high reactivity with residual isocyanate and ease of removal by evaporation.

The higher alcohols and amines could be difficult or impractical to remove by vacuum stripping, in certain cases, and in that event should not be chosen if the treated polymer is to be used in a thermoplastic processing operation. The presence of residual amine or alcohol can cause gas bubbles as well as degradation of the polymer at the temperatures normally employed in thermoplastic processing techniques such as extrusion, injection molding, calendering, etc.

The lower secondary aliphatic and cycloaliphatic amines, that is, those containing less than about seven carbon atoms, are satisfactory reagents in certain combinations with polyurethanes, that is, when a combination is employed which does not bring about agglomeration or other problems. The good diffusion characteristics and high reactivity of these lower amines sometimes can be used to advantage by means of applying them to the particulate solid polyurethane as a dilute solution in one of the lower alcohols which itself might be a suitable reagent, or alternatively as a dilute solution in some other solvent which is a non-solvent for the polyurethane in the same sense as above-described non-solvent reagents, and which is chemically inert with respect to the poyurethane. Such inert non-solvents should have at least a slight tendency to diffuse into the polyurethane, as do the lower alcohols, but should not cause excessive swelling of the polyurethane. The lower aromatic hydrocarbons, such as toluene and the xylenes, are exemplary of such inert non-solvents.

When a lower secondary aliphatic or cycloaliphatic amine is employed as a reagent dissolved in such a non-solvent alcohol or inert non-solvent, it is advantageous to employ just enough non-solvent to thoroughly wet the suface of the particulate solid, and the amount of lower amine dissolved therein should be within the limits described hereinabove for treatment with amine alone, and preferably within the lower end of the range given. In the case of subsequent thermoplastic processing of the treated polyurethane, it would be particularly undesirable for residual amine to be present, as this surely would cause degradation of the polymer as well as probable gassing.

Primary aliphatic amines also can be employed as reagents in selected cases of amine-polyurethane combinations, but as a class the primary amines are less desirable than the secondary aliphatic and cycloaliphatic amines, for several reasons. In general, the primary aliphatic (and cycloaliphatic) amines are more active solvents for the polyurethanes than are secondary amines of like molecular weight, and cause more agglomeration problems and are more difficult to remove from the polyurethane particulate solid when a significant excess has been used. Also, the primary amines are more likely to cause aminolysis if used in excess or if the temperature of the polyurethane should be elevated above normal room temperature during treatment or if there is a residuum of the amine after treatment and the polyurethane is stored for only an ordinary period of time. When primary amines are used, it is preferable to apply them as dilute solutions in the non-solvent alcohols or inert non-solvents described above in direct analogy to the preferred application of the lower secondary amines.

The preferred reagents are the non-solvent secondary aliphatic and cycloaliphatic amines and the non-solvent lower primary and secondary aliphatic alcohols, and also solutions of lower secondary amines in non-solvents described above, which lower secondary amines, if used alone, would have undesirable solvent action on at least some polyurethanes. As there is a great variety of polyurethane thermoplastics to which the process of the invention is applicable, including both polyester and polyether types of a wide range of hardnesses, it is not practical to prescribe which reagents are applicable to each type of polyurethane. Suitable polyurethane-reagent combinations can be determined by simple experimentation. In general, for each polyurethane to be treated there will be at least several reagents or reagent solutions which are suitable, it being recognized that the most suitable reagent or reagent solution for treatment of a given polyurethane may depend on a number of factors, including economic factors, processing equipment available for the treatment process, and the end use intended for the treated polyurethane, that is, whether it is to be used subsequently in a thermoplastic processing operation or as a solution. The preferred non-solvent reagents have the advantage that they do not cause aminolysis or alcoholysis at room temperature, so that the treatment in accordance with the invention can be carried out without the need for cooling to keep the temperature below that at which aminolysis or alcoholysis of urethane or ester groups takes place. Also, they are sufficiently non-reactive with groups other than isocyanate groups that the temperature can be raised up to about 50° C. in the case of the secondary amines and up to about 80° C. in the case of alcohols in order to accelerate the diffusion process.

DETAILED DESCRIPTION OF THE INVENTION

The following example are given by way of illustration only. Parts and percentages are by weight unless otherwise specified.

EXAMPLE 1

A 100 g portion of standard quality in-specification Estane 5701-F1 thermoplastic polyester urethane was weighed into a one-pint paint can and 0.4 ml dibutylamine was added from a syringe. The can was closed immediately, rolled for 20 minutes on an electric roller, and set aside at room temperature for two days. The can then was opened and placed in a vacuum oven, and the oven was evacuated with a mechanical pump to 10 mm Hg and maintained at this pressure, with continued pumping, for one hour. Then, while maintaining the pressure at 8-10 mm Hg, the temperature was increased to 55° C. and maintained at 55°-60° C. for two hours. Air then was admitted to the oven to bring it to atmospheric pressure, and the can was removed immediately. There was no noticeable odor of dibutylamine emitted from the warm granules, although the odor had been quite strong at the time the can was first placed in the oven. The product had a viscosity of 580 cps at 15% non-volatile solids (NVS) in tetrahydrofuran at 25° C., which was within the manufacturer's specification of 300–700 cps.

Samples of the amine-treated and untreated polyurethane granules then were stored at room temperature for six months, at which time new 15% NVS solutions in tetrahydrofuran were prepared. At 25° C., the viscosity of the solution of treated polyurethane was 560 cps, still within specification, while that of the untreated sample was 1,050 cps, not within specification.

EXAMPLE 2

To a 100 g portion of the in-specification polyurethane thermoplastic granules of Example 1 in a one-pint paint can was added 3.0 ml of anhydrous isopropyl alcohol. The can was closed and shaken for about 30 seconds, then set aside at room temperature overnight. The can then was placed in an oven at 50°–55° C. for six hours, and then was opened and placed in a vacuum chamber while still warm. After evacuation at 2 mm Hg for 30 minutes, the can was removed, and no odor of isopropyl alcohol could be detected. After six months' storage at room temperature, a 15% NVS solution of the granules in tetrahydrofuran was prepared and found to have a viscosity of 570 cps at 25° C., which is within the manufacturer's specification. The untreated polyurethane, however, had increased in molecular weight and no longer was within specifications (see Example 1).

EXAMPLE 3

A sample of an extrusion-grade polyurethane granulate, Pellethane 2102-90A-E, was obtained from a commercial plastics thermoformer who claimed that the sample was suitable for extrusion and contained a relatively low amount of gel inclusions. A portion of the sample was dissolved in dimethylformamide at room temperature to provide a 15% NVS solution which indeed contained a relatively small proportion of tiny gel particles. Another portion of the granules was set aside in a closed one-quart paint can and stored at room temperature.

A third, 200 g portion of the sample was placed in a one-pint paint can and 2.0 ml of a 10% solution of dimethylamine in butanol-2 was added to the can. The can was closed immediately and shaken for about one minute to distribute the amine solution. The can then was set aside at room temperature overnight. The next day it was opened and placed in a cold vacuum oven. The pressure in the oven was reduced, and maintained with continuous pumping at 1-2 mm Hg for 30 minutes. Then, while maintaining the pressure below 2 mm Hg the temperature of the oven was increased to 45°-50° C. and held in that range for 30 minutes. The can was removed from the oven, and the warm granules were almost odorless. The can was closed and set aside at room temperature, next to the can of untreated granules, for 7 months. Both cans then were opened and a 45 g portion of each was transferred to a new one-pint can. Dimethylformamide (255 g) then was added to each can so as to provide 15% NVS, and the mixtures were stirred at room temperature to dissolve the granules. After two hours of relatively slow stirring, the granules which had been treated with the dimethylamine solution dissolved to provide a solution virtually identical in appearance to that of the untreated granules prepared seven months earlier. The aged, untreated granules, however, swelled considerably during the two hours' stirring, and provided a much more viscous solution containing a substantial amount of undissolved, swollen solid particles. The can was set aside at room temperature for six days (closed) and then the product was stirred again for 30 minutes. The solution was even more viscous than previously, and still contained a substantial amount of highly swollen solid particles, which evidently contained crosslinked, insoluble polymer. The physical properties of such polyurethanes are known to be degraded when the polyurethanes are subjected to thermoforming processes such as extrusion.

EXAMPLE 4

Using the procedure of Example 3, a sample of in-specification Estane 5714 F-1 was stabilized by treatment with 0.20 weight percent of n-heptylamine. The pressure in the vacuum oven was not reduced, however, until the oven reached the range of 45°-50° C. and had been held in that range for one hour. The pressure then was reduced to below 2 mm Hg and maintained at that level for 30 minutes while the oven was kept at 45°-50° C. The viscosity of a 15% NVS solution of the amine-treated polymer in tetrahydrofuran at 25° C. was 880 cps, which is within the manufacturer's specification of 600–1,200 cps, while the viscosity of the solution of untreated sample was not within specification (1,600 cps at 25° C.).

It is to be understood that the invention is not to be limited to the exact details of operation or structure shown and described, as obvious modifications and equivalents will be apparent to one skilled in the art.

I claim:

1. A process for treating a starting polyurethane having free isocyanate groups selected from thermoplastic-thermosetting polyurethanes and non-thermosetting thermoplastic polyurethanes to stabilize said starting polyurethane against changes in properties on aging or heating due to reaction of said free isocyanate groups, which comprises treating said starting polyurethane in the solid particulate state with a reagent selected from mono-amines and monohydric alcohols reactive with isocyanate groups, said reagent being present in excess of the amount required to react with said free isocyanate groups, and said treating being effected at a temperature below that at which aminolysis or alcoholysis of urethane groups takes place and being continued until the reagent is substantially diffused throughout the particulate polyurethane and substantially all of said free isocyanate groups have reacted with said reagent and then treating the particulate polyurethane to remove unreacted said reagent.

2. The process of claim 1, in which the treated particulate solid is subjected to a vacuum to remove unreacted reagent.

3. The process of claim 1, in which said starting polyurethane is non-thermosetting.

4. The process of claim 1, in which the reagent is non-solvent for the polyurethane.

5. The process of claim 3, in which the reagent is non-solvent for the polyurethane.

6. The process of claim 4, in which the reagent is selected from the group consisting of primary and secondary amines having a $pK_b$ of not more than 6.

7. The process of claim 5, in which the reagent is selected from the group consisting of primary and secondary amines having a $pK_b$ of not more than 6.

8. The process of claim 4, in which the reagent is dissolved in a vehicle non-solvent for said polyurethane and the particulate solid is wetted with the resulting solution.

9. The process of claim 5, in which the reagent is dissolved in a vehicle non-solvent for said polyurethane and the particulate solid is wetted with the resulting solution.

10. The process of claim 6, in which the reagent is a secondary aliphatic or cycloaliphatic amine having from 7 to 10 carbon atoms.

11. The process of claim 7, in which the reagent is a secondary aliphatic or cycloaliphatic amine having from 7 to 10 carbon atoms.

12. The process of claim 10, in which the reagent is dibutylamine.

13. The process of claim 11, in which the reagent is dibutylamine.

14. The process of claim 6, in which the treatment with said reagent is effected at room temperature.

15. The process of claim 7, in which the treatment with said reagent is effected at room temperature.

16. The process of claim 10, in which the treatment with said reagent is effected at room temperature.

17. The process of claim 11, in which the treatment with said reagent is effected at room temperature.

18. The process of claim 6, in which the amount of amine is from about 0.25 percent amine to about 5 percent amine based on dibutyl amine.

19. The process of claim 7, in which the amount of amine is from about 0.25 percent amine to about 5 percent amine based on dibutyl amine.

20. The process of claim 12, in which the amount of dibutylamine is from about 0.25 percent to about 5 percent.

21. The process of claim 13, in which the amount of dibutylamine is from about 0.25 percent to about 5 percent.

22. The process of claim 1, in which said starting polyurethane is thermosetting.

23. The process of claim 22, in which the reagent is non-solvent for the polyurethane.

24. A stabilized, solid, particulate thermoplastic polyurethane essentially free of isocyanate groups and having terminal groups selected from terminal urea groups formed by reacting terminal isocyanate groups with an amine and terminal urethane groups formed by reacting terminal isocyanate groups with an alcohol in the solid particulate condition, said polyurethane being essentially free of unreacted said amine and unreacted said alcohol.

25. A stabilized thermoplastic polyurethane according to claim 24, in which said terminal groups are terminal urea groups formed by reacting terminal isocyanate groups with said amine.

26. A stabilized thermoplastic polyurethane according to claim 24, in which said terminal groups are terminal urethane groups formed by reacting terminal isocyanate groups with said alcohol.

27. A stabilized thermoplastic polyurethane according to claim 25, in which said amine is selected from the group consisting of primary and secondary amines having a $pK_b$ of not more than 6.

28. A stabilized thermoplastic polyurethane according to claim 27, in which said amine is a secondary aliphatic or cycloaliphatic amine having from 7 to 10 carbon atoms.

29. A stabilized thermoplastic polyurethane according to claim 28, in which said amine is dibutylamine.

* * * * *

UNITED STATES PATENT AND TRADEMARK OFFICE
CERTIFICATE OF CORRECTION

PATENT NO. : 4,172,192

DATED : October 23, 1979

INVENTOR(S) : William H. Cook

It is certified that error appears in the above-identified patent and that said Letters Patent are hereby corrected as shown below:

Col. 3, line 41; "ceratin" should read -- certain --
Col. 4, line 18; "suface" should read -- surface --
Col. 5, line 17; "example are" should read -- examples are --

Signed and Sealed this

Eighth Day of April 1980

[SEAL]

Attest:

SIDNEY A. DIAMOND

Attesting Officer

Commissioner of Patents and Trademarks